Feb. 4, 1936.  V. J. RODDY  2,029,944
RECESS FORMING PUNCH AND HOLDER
Filed Nov. 7, 1934
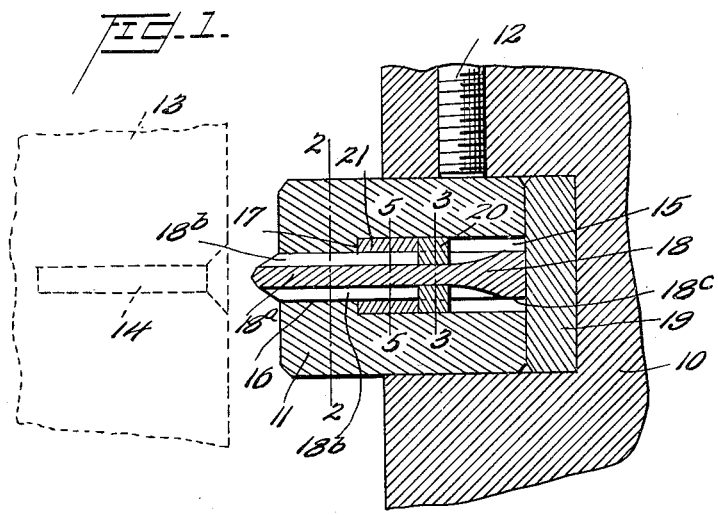
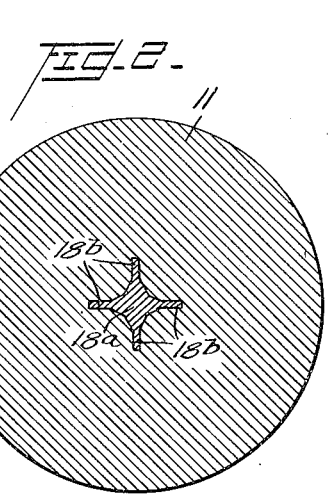
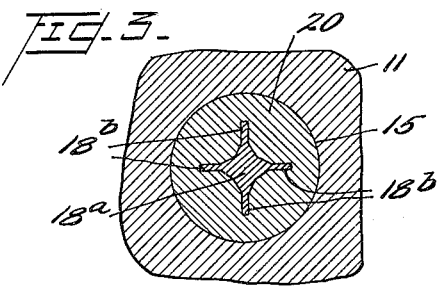
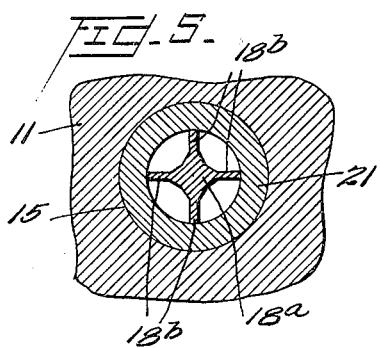
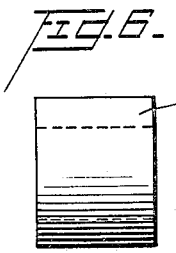

Patented Feb. 4, 1936

2,029,944

UNITED STATES PATENT OFFICE 2,029,944

RECESS FORMING PUNCH AND HOLDER

Vincent James Roddy, Providence, R. I., assignor to American Screw Company, Providence, R. I., a corporation of Rhode Island Application November 7, 1934, Serial No. 751,946

10 Claims. (Cl. 10—24)

My invention relates to an arrangement of punch and holder adapted primarily for use in forming a recess or depression in the head of a screw which is adapted to receive a screw driver or other tool for rotating the screw.

The object of my invention is to provide an arrangement of this kind in which the punch will be firmly held in the proper position in the holder and effectively secured against movement in any direction relative to the holder, and also an arrangement which permits ready removal of a worn or broken punch from the punch holder and the substitution of a new punch therein.

A further object is to provide a punch which is shaped to form a recess in the head of a screw similar to that shown in U. S. Patent No. 308,246, or of like design, and a holder having parts cooperating with the punch to effectively and accurately secure the punch in the holder and accurately form or head-up the head of the screw so as to minimize the amount of shaping operation later necessary to properly shape the head of the screw.

A still further object is to provide an arrangement of this kind by which the depth of the recess formed in the head of the screw may be controlled.

The foregoing and other advantages are obtained by the particular embodiment of my invention illustrated in the accompanying drawings and described in the following specification.

In said drawing:

Figure 1 is a longitudinal section illustrating the improved punch and holder mounted in the movable head or ram of a punching machine;

Figure 2 is an enlarged cross section on the line 2—2 of Figure 1;

Figure 3 is an enlarged cross section on the line 3—3 of Figure 1;

Figure 4 is a side view of the locking bushing later described;

Figure 5 is an enlarged section on the line 5—5 of Figure 1; and

Figure 6 is a side view of the intermediate bushing later described.

Referring to the drawing in detail, 10 indicates a portion of a movable head or ram of a heading machine such as commonly used in heading screws or the like. The head 10 is provided with a recess in which the punch holder 11 is secured in any suitable manner as by means of a set screw 12. As shown, the punch holder 11 extends some distance in front of the head or ram 10 and this holder is adapted to cooperate with a die 13 indicated in dotted lines and in which a screw blank indicated at 14 is clamped or held in any suitable manner.

The die holder 11 is provided with a longitudinal opening extending from the rear to the front thereof. This opening includes a rear portion 15 and a front portion 16. The rear portion 15 is somewhat larger in cross section than the front portion 16, thus producing a shoulder 17 at the front end of the rear portion of the opening. The punch 18 is mounted in the opening of the holder and extends from the rear end thereof to a point slightly beyond the front end or face of the holder.

The punch 18 throughout a considerable portion of its length is formed with a central part 18a from which a plurality of wings 18b extend radially. The rear end of the punch indicated at 18c is preferably made cylindrical.

The front portion 16 of the opening in the holder is shaped to correspond with the shape of the punch, that is, the opening is complementary to the punch. In other words, the punch closely and accurately fits the front portion 16 of the opening. By this means it will be seen that rotation of the punch relative to the holder is prevented.

To prevent rearward movement of the punch in the holder and to securely back up the same, a shock plate 19 is placed in the bottom of the recess in the head or ram.

In order to retain the punch 18 against forward movement in the holder 11, I provide a locking bushing 20 which is mounted in the rear portion 15 of the opening in the holder and which surrounds the punch. The bushing 20 is also provided with an opening shaped to accurately correspond with the contour of the punch as clearly seen in Figure 3. The opening in the bushing 20 is accurately formed so that when the punch 18 is inserted in the punch holder the distance to which the punch can extend into the locking bushing 20 will be controlled by the enlargement at the rear end of the punch. In other words, the locking bushing 20 and the rear end of the punch are provided with coacting surfaces which determine the extent to which the punch may be inserted through the locking bushing 20. The bushing 20 preferably is made to accurately fit the rear portion 15 of the opening in the punch holder.

Arranged in front of the locking bushing 20 is an intermediate or spacing bushing 21. The front end of the bushing 21 is adapted to bear against the shoulder 17 and the rear end thereof against the locking bushing 20. Since the locking bushing is locked or secured to the punch by engagement of the enlarged rear portion of the punch with the opening in the bushing it will be seen that through the medium of the bushings 20 and 21 and shock plate 19 the punch 18 will be accurately positioned or locked in the punch holder 11.

The bushings 20 and 21 are of such size that the punch 18 will project the proper distance beyond the front face of the punch holder. It will be noted that the front or operative end of the punch 18 is generally conical in contour with the base of the cone located exactly in the front surface of the punch holder 11. This is important in order that the head of the screw after being punched will be properly shaped by the front end of the punch holder so as to minimize the amount of cutting or shaping subsequently necessary to properly finish the screw head.

It will be apparent that the punch holder 11 may be easily and quickly removed from the head 10 by loosening the screw 12 so that a new punch 18 may readily be inserted in the holder 11 and the same replaced in the head or ram of the machine.

Various changes in details of the foregoing construction may, of course, be resorted to within the scope of my invention.

Having thus described the invention, what is claimed as new and desired to be secured by Letters Patent is:

1. In a construction of the kind described, in combination, a punch holder having an opening therein, a punch mounted in said opening, a locking bushing arranged in said opening and surrounding said punch, said bushing and punch having interengaging surfaces thereon to limit forward movement of said punch relative to the bushing, means for holding said bushing against forward movement in said holder, and interengaging means on said holder and punch to prevent rotation of the punch in the holder.

2. In a construction of the kind described, in combination, a punch holder having an opening therein, a punch mounted in said opening, a locking bushing arranged in said opening and surrounding said punch, said locking bushing and punch having interengaging surfaces thereon to limit forward movement of said punch relative to the bushing, an intermediate bushing arranged in said opening in front of said locking bushing and serving to prevent forward movement of the latter bushing in said opening, and interengaging means on said holder and punch to prevent rotation of the punch in the holder.

3. In a construction of the kind described, in combination, a punch holder having an opening therein, said opening including a front portion and a rear portion of larger cross sectional area than the front portion, whereby a shoulder is formed at the front end of said rear portion, a punch mounted in said opening, a locking bushing arranged in the rear portion of said opening and surrounding said punch, said locking bushing and punch having interengaging surfaces thereon to limit forward movement of the punch relative to the bushing, means arranged between said bushing and shoulder to hold said bushing against forward movement in said opening, and interengaging means on said holder and punch to prevent rotation of the punch in the holder.

4. In a construction of the kind described, in combination, a punch holder having an opening therein, said opening including a front portion and a rear portion of larger cross sectional area than the front portion, whereby a shoulder is formed at the front end of said rear portion, a punch mounted in said opening, a locking bushing arranged in the rear portion of said opening and surrounding said punch, said locking bushing and punch having interengaging surfaces thereon to limit forward movement of the punch relative to the bushing, an intermediate bushing arranged between said shoulder and said locking bushing to hold the latter against forward movement in said opening, and interengaging means on said holder and punch to prevent rotation of the punch in the holder.

5. In a construction of the kind described, in combination, a punch holder having an opening therein, a punch arranged in said opening and extending beyond the front end of the holder, said punch throughout a portion of its length being formed with a body part and a plurality of wings extending radially from said body part, said opening having a cross sectional shape which is complementary to and which closely fits said punch, and means to retain said punch in said opening.

6. In a construction of the kind described, in combination, a punch holder having an opening therein comprising a front portion and a rear portion, a punch arranged in said opening and extending beyond the front end of the holder, said punch throughout a portion of its length being formed with a body part and a plurality of wings extending radially from said body part, said last named portion of said punch being arranged in the front portion of said opening, the front portion of said opening having a cross sectional shape which is complementary to and which closely fits said punch, a locking bushing arranged in the rear portion of said opening and surrounding said punch, said bushing and punch having interengaging surfaces thereon to limit forward movement of said punch relative to the bushing, and means for holding said bushing against forward movement in said holder.

7. In a construction of the kind described, in combination, a punch holder having an opening therein comprising a front portion and a rear portion, a punch arranged in said opening and extending beyond the front end of the holder, said punch throughout a portion of its length being formed with a body part and a plurality of wings extending radially from said body part, said last named portion of said punch being arranged in the front portion of said opening, the front portion of said opening having a cross sectional shape which is complementary to and which closely fits said punch, and means in the rear portion of said opening for retaining said punch in the opening.

8. A punch holder having an opening therein, a punch mounted in said opening, said punch having a longitudinal body portion and longitudinal wings projecting radially therefrom, said opening in the holder having a shape in cross section which is complementary to and which closely fits said punch, and means for holding the punch against longitudinal movement in said opening.

9. A punch holder having an opening therein, a punch arranged in said opening, said punch having a longitudinal central portion and a plurality of wings extending laterally from said central portion, said opening having a shape in cross section which is complementary to and which closely fits said punch, and means to retain said punch in the opening.

10. A structure as defined in claim 8 in which said last named means includes a locking bushing in said opening surrounding said punch and a collar in said opening in front of said bushing.

VINCENT JAMES RODDY.